UNITED STATES PATENT OFFICE.

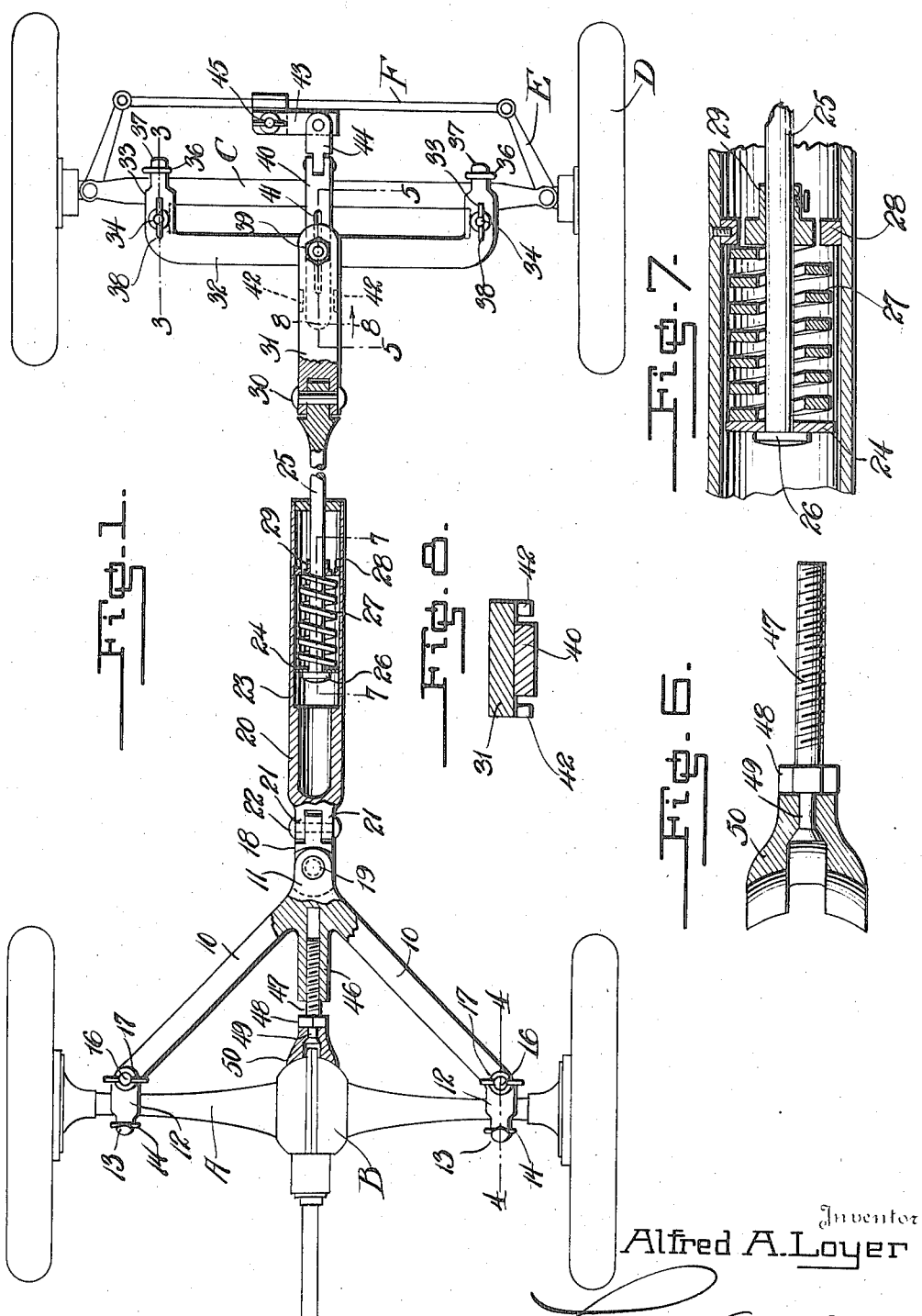

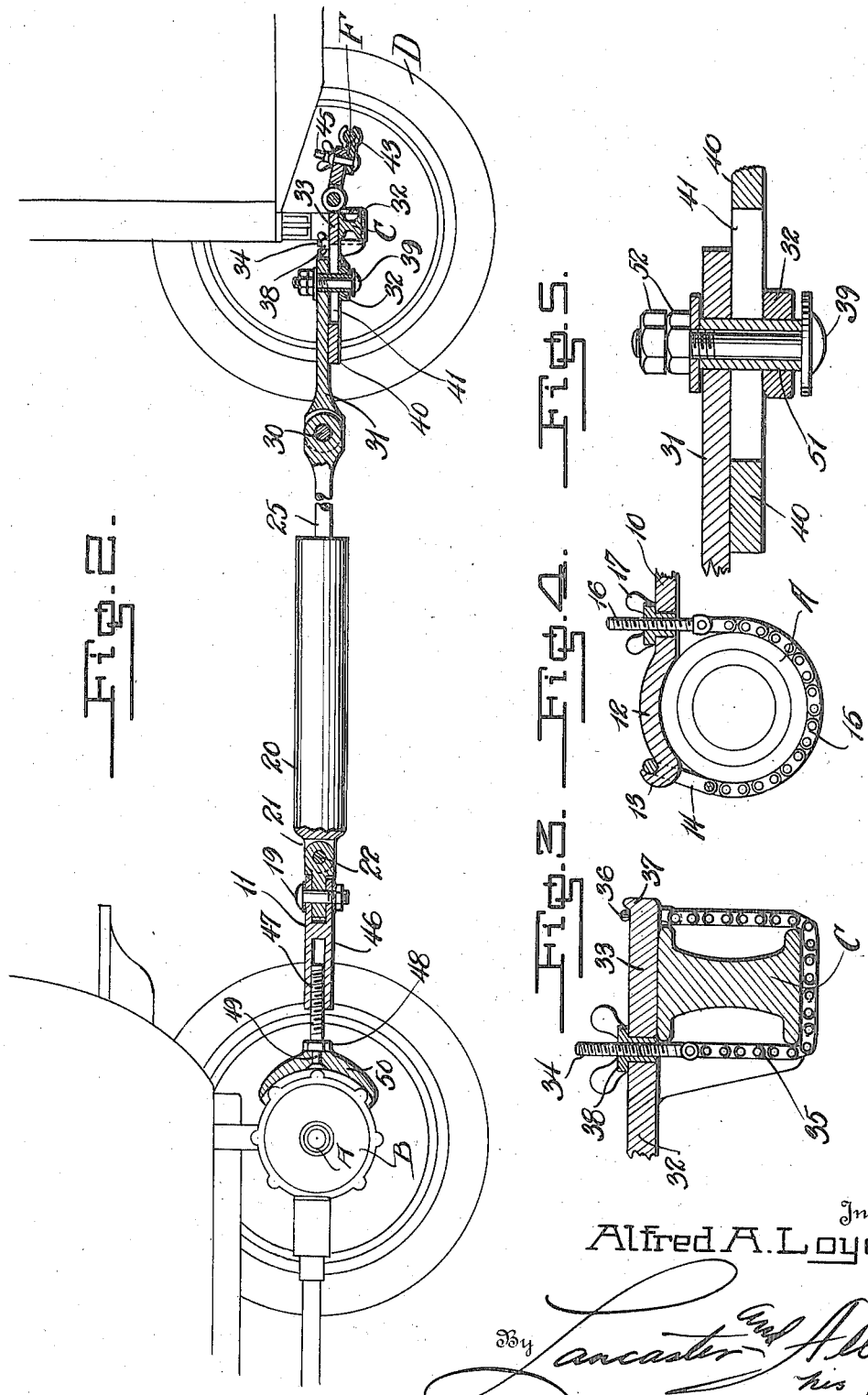

ALFRED A. LOYER, OF LAREDO, TEXAS.

TOWING DEVICE FOR VEHICLES.

1,286,367.　　　　　Specification of Letters Patent.　　Patented Dec. 3, 1918.

Application filed May 26, 1917. Serial No. 171,251.

*To all whom it may concern:*

Be it known that I, ALFRED A. LOYER, a citizen of the United States, and a resident of Laredo, in the county of Webb and State of Texas, have invented a certain new and useful Improvement in Towing Devices for Vehicles, of which the following is a specification.

The present invention relates to an attachment for self-propelled vehicles, and has more particular reference to a means for connecting two or more of the same together to tow a disabled vehicle.

An object of the present invention is to provide a towing device of this character which may be quickly and easily applied to the vehicles, which is adapted not only to draw the towed vehicle, but to also guide the same so that an operator is not required in the towed vehicle, and to provide a towing device with shock-absorbing means adapted to operate upon the forward impulse of the towed vehicle, as well as upon the starting or jerking of the driving vehicle.

The invention further aims at the provision of a towing device embodying these characteristics, and which is adapted for application to the axles and steering rods of motor vehicles, and which may be readily adjusted and applied to vehicles of various types.

The above, and various other more or less important features and advantages of this invention will be in part described, and in part understood, from the following detailed description of the present preferred embodiment, the same being illustrated in the accompanying drawings, wherein:

Figure 1 is a plan view of a towing device constructed according to the present invention, shown partly in section, and as applied to the front and rear axle portions of two different vehicles.

Fig. 2 is a side elevation of the same, partly shown in section, the vehicle portions being also shown.

Fig. 3 is a transverse section taken on the line 3—3 of Fig. 1, enlarged and showing one of the adjustable clamps for the rear yoke of the device.

Fig. 4 is a similar view taken on the line 4—4 of Fig. 1, showing one of the adjustable clamps carried upon the forward yoke of the device.

Fig. 5 is a fragmentary enlarged view in longitudinal section, taken substantially on the line 5—5 of Fig. 1, through the pivotal connection of the steering bar adapted for connection with the forward end of the vehicle to be towed.

Fig. 6 is a detail enlarged view in section, through the intermediate brace carried upon the forward yoke of the device, for reinforcing the rear axle of the driving machine.

Fig. 7 is a fragmentary enlarged section taken longitudinally substantially on the line 7—7 of Fig. 1, through the draw bar cylinder and the parts mounted therein.

Fig. 8 is a transverse section taken on the line 8—8 of Fig. 1.

Referring to these drawings, wherein like parts are designated by similar characters of reference throughout the several views, A designates the rear axle of a driving machine, provided in the usual manner, with a differential gear casing B. C designates the front axle of a machine or vehicle adapted to be towed or drawn, the same having the usual road-engaging steering wheels D pivotally mounted upon opposite ends of the axle C and having steering arms E extending rearwardly from the axle and connected together by means of a steering rod F.

The towing device comprises a front yoke 10 provided with rearwardly converging arms terminating in a transversely extending fork 11. The forward ends of the yoke 10 extend forwardly substantially in parallelism and may be arched upwardly to a slight extent to fit over the upper side of the rear axle A, as shown to advantage in Fig. 4. These arched portions of the yoke arms comprise clamping plates 12, and the latter are provided upon their forward ends with slightly upturned lips 13 adapted to receive thereover the upper ends of links 14 carried upon the ends of chains, or other flexible members 15, adapted to encircle the lower portion of the axle A beneath the plates 12, and which are hingedly connected at their free ends to elongated threaded bolts 16. The bolts 16 extend upwardly through the arms of the yoke 10 against the rear side of the axle A, and wing nuts, or the like, 17 are threaded upon the upper ends of the bolts 16 and are provided with depending cylindrical projections adapted to surround the bolts 16 and to extend downwardly through the arms of the yoke.

A knuckle block 18 is provided upon its forward end with a tongue adapted to fit between the arms of the fork 11, and which is pivotally mounted in the fork by a substantially vertically extending pin 19. A draw bar is connected to the rear end of the block 18, and has its forward part in the form of a cylinder 20 provided with a pair of forwardly projecting ears 21 to receive the forward end of the block 18 therebetween, and to also receive the pivot pin 22 which engages the ears and the said block. A knuckle joint is thus provided between the fork pin and the draw bar, which admits of the vertical and horizontal flexing of the forward end of the towing device.

The cylinder 20 is provided, near its forward end, with an internal shoulder 23 against which is adapted to engage a plunger disk 24 which is mounted upon the end of a plunger rod 25, and held thereto by means of the plunger head 26. A coil spring 27 surrounds the plunger rod 25 and bears against the disk 24 to hold the latter against the head 26. The head 26 is of less diameter than that of the disk 24, and adapted to move into the forward reduced portion of the cylinder 20. The other end of the coil spring 27 engages an internal shoulder 28, in the form of a collar, which is suitably secured within the cylinder 20 adjacent to the rear end of the same. The plunger rod 25 is also provided with a collar 29 adjustably mounted thereon and of a diameter adapted to move freely past the collar 28 of the cylinder. The rear end of the spring 27 is suitably reduced for engagement with the collar 29 to hold the spring 27 under the desired tension against the disk 24.

The rear end of the plunger rod 25 is pivotally connected by means of a substantially horizontally disposed pivot pin 30 to a link 31 which in turn is connected to a rear yoke or bracket 32 in the form of a flat bar having its opposite ends extending rearwardly for engagement across the front axle C of the vehicle to be towed. The rear ends of the yoke 32 provide clamping plates 33, and the latter are provided with downwardly extending elongated threaded bolts 34 which are pivotally connected at their lower ends to chains or other flexible members 35 adapted to encircle the axle C adjacent to the opposite ends thereof. Links 36 are mounted upon the ends of the chain 35 and are adapted to engage over lips 37 formed upon the rear free ends of the plates 33. Wing nuts 38 are threaded upon the upper ends of the bolts 34, to raise the same and bind the chains 35 about the axle, the nuts 38 preferably projecting downwardly through the plates and about the bolts 34 to guide the same.

The link 31 is pivotally connected at its rear end to the yoke 32 by means of a bolt or pin 39 which preferably projects upwardly through the yoke 32 and through the link 31. A steering bar 40 is provided with a longitudinally extending slot 41 therein, through which the pin 39 is adapted to project. The steering bar 40 is adapted to engage against one side of the link 31, and the latter is of relatively flat formation and provided adjacent its lateral edges with a pair of opposed ribs or lugs 42 for engagement against the opposite edges of the steering bar 40. The steering bar 40 is adapted to be moved longitudinally between the ribs 42 and upon the pin 39. A clamp 43 is adapted to be secured to the steering rod F at any suitable point, and is connected to the rear end of the steering bar 40 by means of a knuckle 44. The clamp 43 is preferably in the form of a body member having an arcuate portion adapted to extend over one side of the steering rod F and which is provided with a correspondingly formed clamping plate for engagement against the opposite side of the steering rod F, and which is connected by means of a bolt 45 to the body of the clamp 43. The bolt 45 is adapted to be relatively long, for adjusting the clamp 43 to steering rods varying in thickness.

The front yoke 10 may be provided intermediate the arms thereof with a forwardly extending hollow shank or sleeve portion 46 into which is threaded a jack screw 47 having an angularly faced head 48 upon its outer end, and provided with a guiding and anchoring pin 49. This brace member so formed, is provided with a head portion 50 adapted to engage against the rear side of the differential gear housing B, and is of such configuration as to substantially conform to the contour thereof. The pin 49 projects into the head 50 and forms substantially a swivel joint between the screw 47 or the brace arm, and the head 50.

The bolt 39 is preferably provided with a bushing 51 as shown in Fig. 5, which projects through the link 31, the slot 41 of steering bar 40, and through the bracket 32. A washer is seated against the free end of the bushing and superposed nuts 52 are turned tight upon the bolt 39 to hold the same in the bushing and through said members.

When it is desired to apply the towing device of this invention, it is only necessary to release the screws 16 of the front clamps sufficiently to disengage the links 14 from the lips 13. The front yoke 10 is now applied to the rear axle A, the chains 15 are wrapped about the axle, and the links 14 are engaged over the lips 13. The nuts 17 are now tightened to bind the chains 15 about the axle for holding the yoke 10 rigidly thereto. In order to brace the axle against any undue strain, the head 50 is placed against the housing B of the axle, and the screw 47 is turned up against the head 50 to brace the same. The rear yoke or bracket 32 is in a somewhat similar manner applied to the front axle C of the vehicle to be towed. In this instance, the nuts 38 are raised upon the bolts 34 to release the chains 35 from the axle C. The links 36 may now be disengaged from the lips 37, and when the rear clamps are applied to the axle C, the flattened chains 35 may be readily swung beneath the axle C and secured by means of the links 36 to the rear ends of the clamping plates 33. The tightening of the nuts 38 binds the chains 35 to the axle and thus holds the rear yoke 32 thereon. The clamp 43 is adjusted to the steering rod F, and the device is then in position for use.

In first starting, the driving vehicle which carries the axle A draws the cylinder 20 forwardly and engages the rear end of the spring 27 against the internal collar 28 of the cylinder. The forward end of the spring 27 is held against the disk 24 of the plunger rod 25, and there is thus a flexible and yielding connection between the two parts 20 and 25 of the draw bar. The spring 27 absorbs the shock of starting and prevents undue strain upon the pin and other connections of the device.

When the vehicles are in motion, and there is a forward impulse of the vehicle being towed, the plunger 25 is carried forwardly in the casing 20, and the disk 24 strikes the internal shoulder 23 of the cylinder to arrest the forward movement of the forward end of the spring 27. The head 26 of the plunger 25, however, is permitted to advance forwardly in the cylinder 20, and compress the spring 27 between the disk 24 and the collar 29. This compression of the spring 27 absorbs shock incident to the forward impulse of the rear vehicle, and also affords a means for holding the vehicles apart to prevent damage of the same by the rear vehicle striking the forward vehicle.

It is of course understood that the device may be applied oppositely to the vehicles, so that the rear vehicle may be the driving one, and the steering or guiding will in that event have to take place with the front vehicle.

It is of course understood that various changes and modifications may be made in details of construction of the above specifically described towing device, without departing from the spirit of the invention, and being restricted only by the scope of the following claims.

I claim:

1. In a towing device, the combination of front and rear brackets adapted for securement to the front and rear ends of vehicles, a two-part draw bar carried by the brackets, one of said parts including a cylinder and the opposite part including a plunger, a spring surrounding the plunger in the cylinder, a disk on the free end of the plunger engaging the spring, a collar adjustably mounted on the plunger adjacent the opposite end of the spring, a head on the plunger retaining the disk thereon, and opposed shoulders arranged within the opposite ends of the cylinder for engagement respectively, with said disk to compress the spring upon the forward movement of the plunger rod, and for engagement with the rear end of the spring upon the rearward movement of the plunger rod to cushion the forward and rearward shock to which the draw bar is subjected.

2. In a towing device, the combination of a draw bar, a bracket pivotally mounted upon each end of the draw bar, clamping plates carried upon the opposite ends of the brackets adapted for engagement over the opposite ends of the front and rear axles of vehicles, flexible elements adjustably carried by said clamping plates, lips on the free ends of said clamping plates, and links carried by said flexible elements for engagement over said lips, said flexible elements being adapted to be drawn taut to bind the same against said lips and about said axles.

3. In a towing device, the combination of a draw bar, a yoke mounted on each end of the draw bar, chains adjustably mounted upon the free ends of the yokes and adapted for engagement about the front and rear axles of vehicles, anchoring means carried upon said yokes for engagement with the free ends of said chains, and means for drawing said chains taut to bind the same against the anchoring means and about said axles.

4. In a towing device, the combination, of an extensible draw bar, a yoke connected to the forward end of said draw bar for vertical and horizontal pivotal movement, axle engaging clamps carried by the arms of said yoke, a sleeve formed upon the yoke between the arms thereof, a jack screw adjustably carried by the sleeve, a bracing head formed upon the outer end of said jack screw and adapted for engagement with the differential casing on an automobile.

5. In a towing device, the combination, of an extensible draw bar, a yoke carried by the front end of the draw bar, a swivelly supported bracing head adapted for engagement with said casing, and means adjustably connecting said head to said yoke.

6. In a towing device, the combination, of an extensible draw bar, a yoke carried at the front end of said draw bar, a swivelly supported bracing head adapted for engagement with the differential casing, means adjustably connecting said head to said yoke, plates carried by the ends of the arms of said yoke for engagement over a vehicle axle, flexible elements adjustably carried by said clamping plates, and lips formed upon the free ends of said clamping plates and adapted for engagement with links of said flexible elements for binding the plates upon a vehicle axle.

7. In a towing device, the combination of an extensible draw bar, a steering device connected to the draw bar and adapted for engagement with the steering mechanism of one of the vehicles to guide the same by the swaying of the draw bar, a yoke carried by the front end of the draw bar, a swivelly supported bracing head adapted for engagement with a differential casing of an automobile, and means adjustably connecting said head to said yoke.

8. In a towing device, the combination of a two-part draw bar, a resilient connection between the parts of the draw bar, axle clamping plates carried at the free ends of the parts of the draw bar, chains connected to said draw bar and adapted for engagement about a vehicle axle, and lips formed upon said clamping plates for engagement with links of said chains.

9. In a towing device, the combination of a two-part draw bar, a resilient connection between the parts of the draw bar, a yoke carried at the front end of the draw bar, a swivelly supported bracing head adapted for engagement with a differential casing of an automobile, means adjustably connecting said head to said yoke, clamping plates carried by the ends of the arms of said yoke for engagement over a vehicle axle, flexible elements adjustably carried by said clamping plates, lips on the free ends of said clamping plates, and links carried by said flexible elements for engagement over said lips whereby said flexible elements may be drawn taut about an axle to bind said clamping plates to the axle.

ALFRED A. LOYER.